(12) United States Patent
Stephenson et al.

(10) Patent No.: US 10,357,922 B2
(45) Date of Patent: Jul. 23, 2019

(54) EDGE BREATHERS FOR COMPOSITE PRODUCTS

(71) Applicant: The Boeing Company, Chicago, IL (US)

(72) Inventors: Benjamin Jeffrey Stephenson, Seattle, WA (US); Jake Adam Reeves, Newcastle, WA (US); William H. Ingram, Jr., Puyallup, WA (US); Charles W. Thomas, Issaquah, WA (US); Karl M Nelson, Issaquah, WA (US); Cameron Bunch, Auburn, WA (US)

(73) Assignee: The Boeing Company, Chicago, IL (US)

(*) Notice: Subject to any disclaimer, the term of this patent is extended or adjusted under 35 U.S.C. 154(b) by 477 days.

(21) Appl. No.: 14/990,736

(22) Filed: Jan. 7, 2016

(65) Prior Publication Data
US 2017/0197370 A1 Jul. 13, 2017

(51) Int. Cl.
*B29C 70/34* (2006.01)
*B29C 70/06* (2006.01)
(Continued)

(52) U.S. Cl.
CPC .......... *B29C 70/342* (2013.01); *B29C 70/06* (2013.01); *B29C 70/54* (2013.01);
(Continued)

(58) Field of Classification Search
CPC ....... B29C 70/06; B29C 70/342; B29C 70/54; B29C 70/44; B29C 70/546–548;
(Continued)

(56) References Cited

U.S. PATENT DOCUMENTS 980,442 A * 1/1911 Schlafly .................. E02B 13/00
138/159
3,391,424 A * 7/1968 Drossbach ............ B26F 1/0038
425/290

(Continued)

OTHER PUBLICATIONS

Airtech, Advanced Materials Group, Airweave, Data SheetNon-Woven Polyester Breather/Bleeders, Jul. 26, 2005.
(Continued)

*Primary Examiner* — Matthew J Daniels
*Assistant Examiner* — Yunju Kim
(74) *Attorney, Agent, or Firm* — Duft & Bornsen, PC

(57) ABSTRACT

Systems and methods are provided for enhancing edge breathers for composite manufacturing. One exemplary embodiment is an apparatus that includes an edge breather to facilitate manufacturing of a composite part. The edge breather includes a body, ridges disposed along a length of the body that each define an arc which is perpendicular to a lengthwise axis of the body, and openings disposed along the body that enable air to enter a hollow interior that runs along the length of the body. The arcs defined by the ridges resist compressive loads applied to the edge breather and prevent the hollow interior from collapsing under pressure applied to the edge breather by a vacuum bag during manufacturing of the composite part.

19 Claims, 19 Drawing Sheets

(51) Int. Cl.
  *B29C 70/54* (2006.01)
  *B29K 105/06* (2006.01)
  *B29K 105/00* (2006.01)
  *B29L 31/30* (2006.01)

(52) U.S. Cl.
  CPC .... *B29K 2105/06* (2013.01); *B29K 2105/253* (2013.01); *B29L 2031/3085* (2013.01)

(58) Field of Classification Search
  CPC .............. B29C 70/443; B29K 2105/06; B29K 2105/253; B29L 2031/3085; E02B 11/005; E02B 13/00; G02B 6/4459; B26F 1/0038
  USPC ........ 264/102, 511, 258; 138/120, 159, 121, 138/122; 425/290; 405/36, 43, 45, 49, 405/50
  See application file for complete search history.

(56) References Cited

U.S. PATENT DOCUMENTS

| | | | | |
|---|---|---|---|---|
| 3,566,607 A | * | 3/1971 | Sixt | ........................ E02B 11/005 138/121 |
| 4,132,755 A | * | 1/1979 | Johnson | ................. B29C 70/443 264/102 |
| 8,298,473 B2 | | 10/2012 | Dull et al. | |
| 2009/0051076 A1 | * | 2/2009 | Kofoed | ................. B29C 70/443 264/258 |
| 2013/0113142 A1 | * | 5/2013 | Dull | ...................... B29C 70/342 264/511 |

OTHER PUBLICATIONS

German Advanced Composites, MTI hose, http://german-advanced-composites.com/mti-hose/, Oct. 6, 2015.
German Advanced Composites, MTI Process, http://german-advanced-composites.com/mti-hose/process.html.
MTI Hose—German Advanced Composites, MTI Hose, http://german-advnaced-composites.com/mti-hose/, Nov. 3, 2015.
MTI Hose—How it Works in the Resin Infusion Process, GA Composites, https://www.youtube.com/watch?v=oXfysVJ8w4, Oct. 6, 2015.
Space Frame, https://en.wikipedia.org/wiki/Space_frame, 106/6/2015.
U.S. Appl. No. 14/936,870.

* cited by examiner

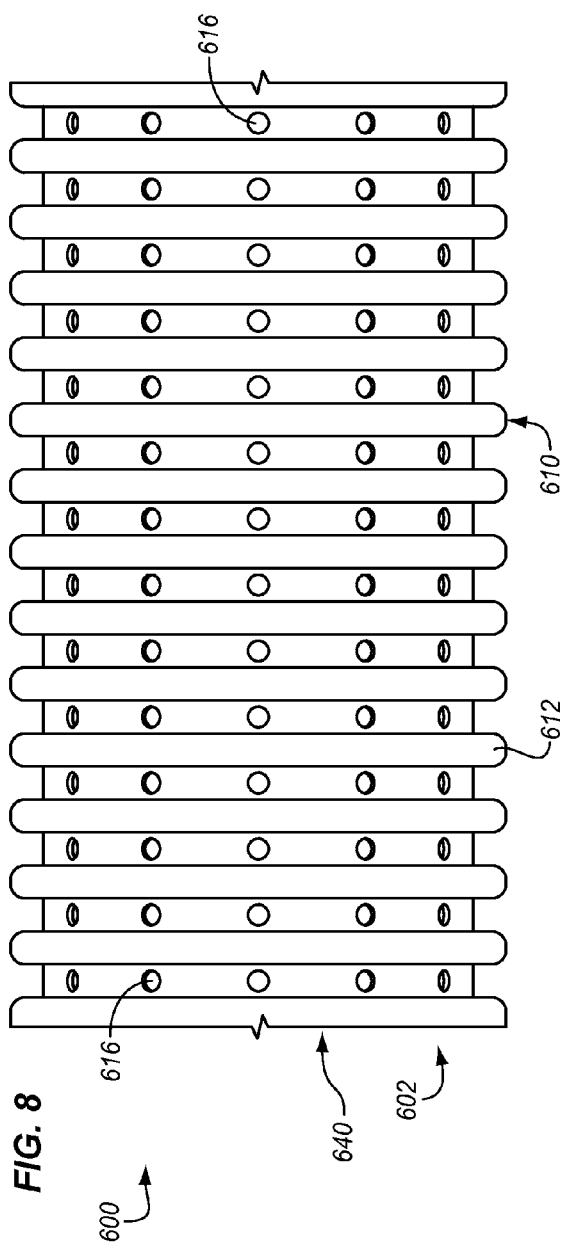
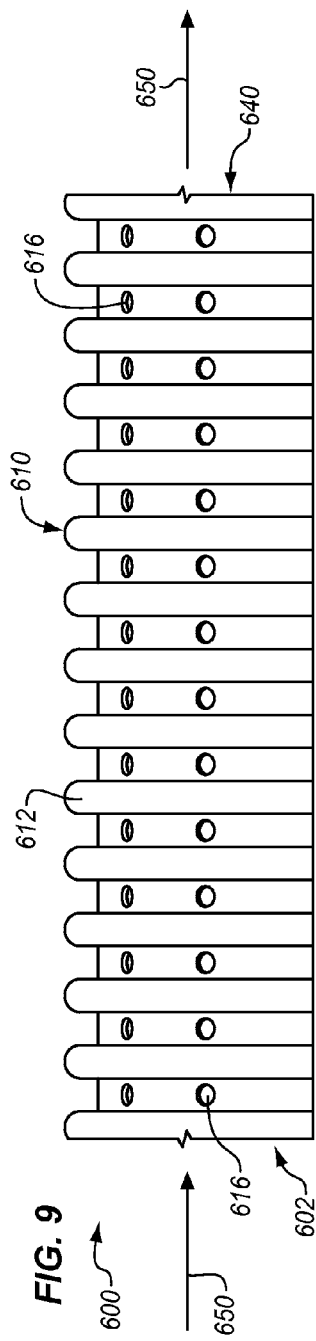

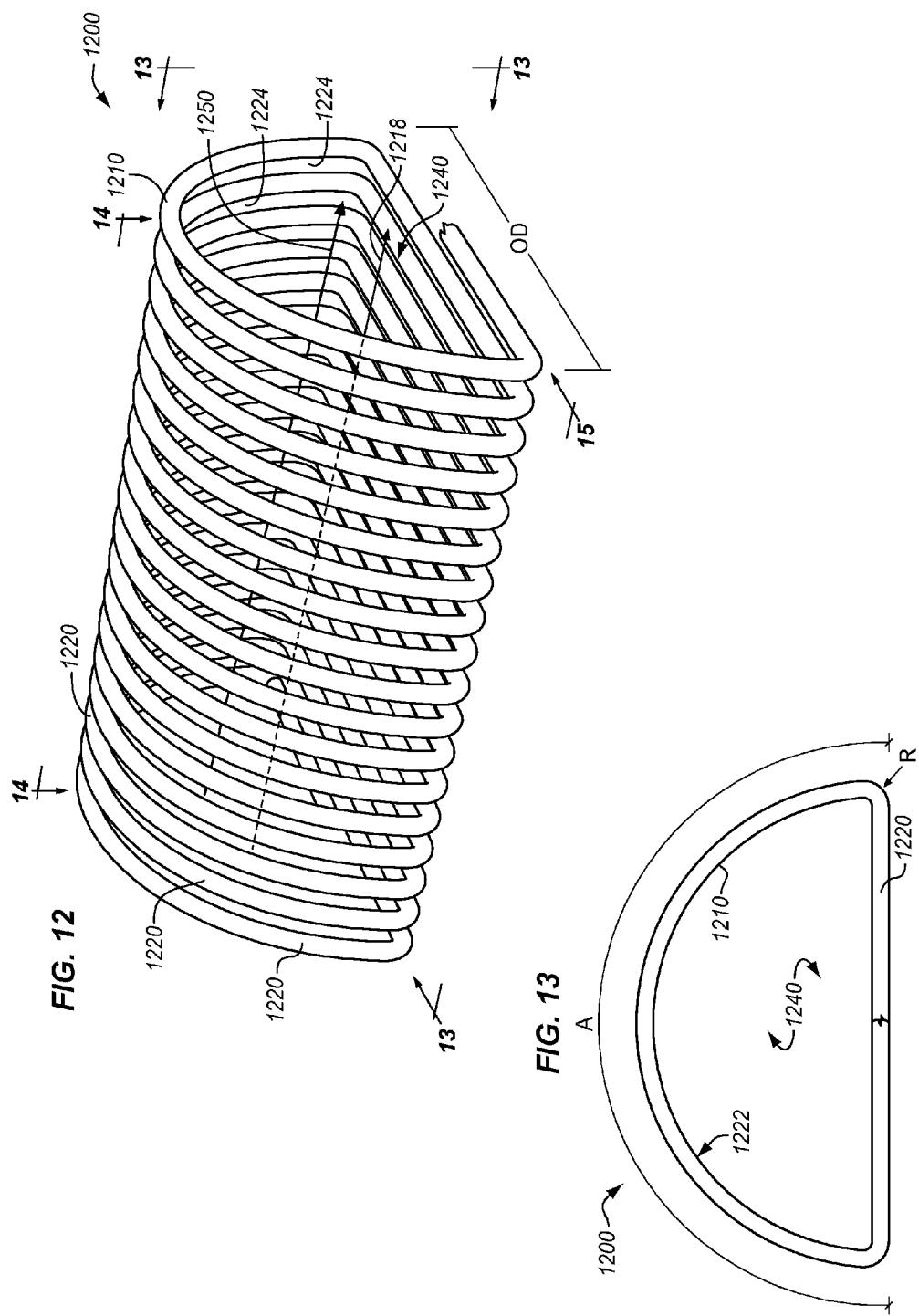

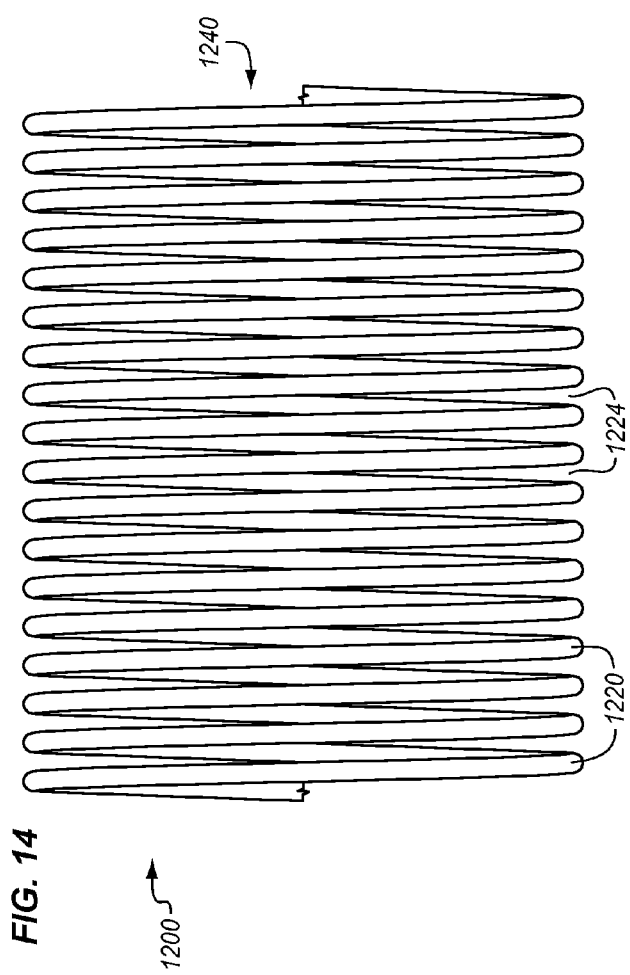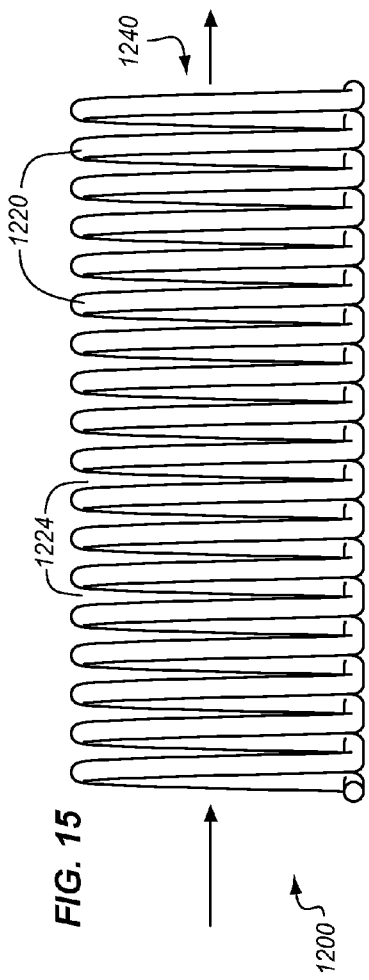

EDGE BREATHERS FOR COMPOSITE PRODUCTS

FIELD

The disclosure relates to the field of manufacturing, and in particular, to composite vacuum bag manufacturing processes.

BACKGROUND

Many composite parts (e.g., carbon fiber products, such as aircraft wings) are manufactured via vacuum bag manufacturing processes. Using these techniques, layers/plies of constituent material are laid-up and cured to consolidate into a composite part. In order to ensure that the layers consolidate into a desired shape, the layers are placed within a vacuum bag. The vacuum bag applies pressure to contour and consolidate the layers against the surface of a working tool (e.g., a mold), and to remove volatile compounds present within the layers.

As a part of this process, soft components known as breathers are placed nearby the composite part. These breathers provide a passageway for air and gaseous volatiles to exit the vacuum bag. However, the industry continues to seek out enhanced designs for breathers that decrease cost and/or increase quality.

SUMMARY

Embodiments described herein include enhanced edge breathers for composite parts. In particular, the edge breathers are designed to have rigid cross sections that resist crushing forces applied by a vacuum bag and heat applied by an autoclave. At the same time, at least some of the edge breathers described herein are substantially flexible along their length. This ensures that the edge breathers hold to any suitable shape for a part (even a curved shape), while also resisting the substantial crushing forces and high temperatures applied when curing the part (e.g., 90 pounds per square inch (PSI) of negative pressure applied by a vacuum bag, at hundreds of degrees Fahrenheit in an autoclave). Furthermore, because the edge breathers are not substantially damaged by the curing process, they may be utilized multiple times during the production of the composite part in order to save cost.

One exemplary embodiment is an apparatus that includes an edge breather to facilitate manufacturing of a composite part. The edge breather includes a body, ridges disposed along a length of the body that each define an arc which is perpendicular to a lengthwise axis of the body, and openings disposed along the body that enable air to enter a hollow interior that runs along the length of the body. The arcs defined by the ridges resist compressive loads applied to the edge breather and prevent the hollow interior from collapsing under pressure applied to the edge breather by a vacuum bag during manufacturing of the composite part.

A further exemplary embodiment is an apparatus that includes a vacuum port to facilitate manufacturing of a composite part. The vacuum port includes a body, a fitting within the body that receives a vacuum hose, and a hollow passageway defined by the body that penetrates a sidewall of the body and cuts through a bottom portion of the body. The vacuum port also includes a channel that couples the passageway to the fitting to enable air to freely travel from the passageway to the fitting. The passageway is dimensioned to cover an edge breather without compressing the edge breather when the port is laid atop the edge breather.

A further exemplary embodiment is a system that includes a composite manufacturing mold, a composite part placed atop the mold, and edge breathers that conform with a perimeter of the composite part. The edge breathers have a rigid cross-section. A vacuum bag is placed atop the edge breathers and is sealed to the mold. A vacuum port penetrates the vacuum bag, and provides a route for air to exit the edge breather and travel into the vacuum port.

Yet another exemplary embodiment is a method. The method includes placing a composite part on a mold, and conforming edge breathers that have rigid cross sections to a perimeter of the composite part. The method also includes drawing at least one atmosphere of negative pressure within the vacuum chamber, resisting crushing forces applied to the edge breathers by the negative pressure to prevent hollow interiors of the edge breathers from contracting, and drawing volatile gases from the composite part through the edge breathers and out of the vacuum chamber.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 6-9 illustrate a first style of edge breather in an exemplary embodiment.

FIGS. 12-15 illustrate a second style of edge breather in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
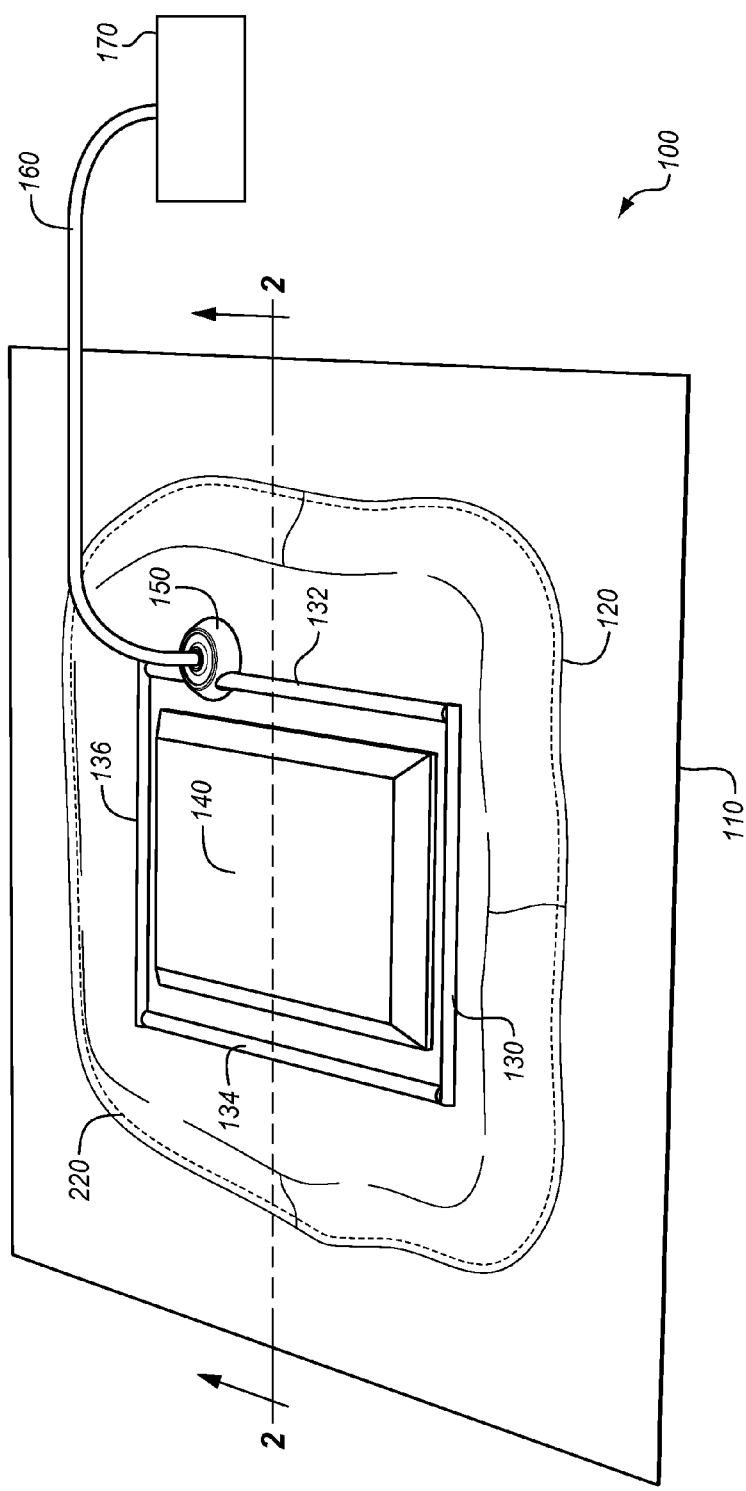
FIG. 1 is a diagram of a vacuum bag manufacturing system in an exemplary embodiment.

FIG. 1 is a block diagram of a vacuum bag manufacturing system 100 in an exemplary embodiment. System 100 comprises any combination of components and/or devices that are capable of utilizing vacuum bag techniques to consolidate and/or cure a composite part (e.g., a fiber reinforced composite part such as an aircraft wing or any other suitable component). System 100 has been enhanced to utilize edge breathers (130, 132, 134, 136) with rigid cross-sections that resist crushing pressure and heat applied during the curing process (e.g., hundreds of ° F. and/or 90 PSI), and that also define hollow interiors that air and volatile gases may travel through in order to exit system 100 (e.g., via vacuum hose 160). Unlike soft edge breathers, the edge breathers described herein do not crush or constrict when curing pressure and heat are applied.

In this embodiment, system 100 includes rigid tool 110 (e.g., a mold). Part 140 conforms to an upper surface of tool 110 during manufacturing. As shown in FIG. 1, part 140 is held in place on tool 110 via vacuum bag 120, which is taped/sealed via edge sealant 220 to tool 110. Vacuum bag 120 covers part 140, as well as edge breathers 130, 132, 134, and 136. The edge breathers (130, 132, 134, 136) have hollow interiors that act as passageways for air and volatile gases from the curing process to travel out from part 140. The air and volatile gases exit vacuum bag 120 via port 150, which is coupled with vacuum line 160. Vacuum line 160 is powered in this embodiment by vacuum pump 170.

While in operation in one embodiment, vacuum pump 170 may generate about one atmosphere of negative pressure on vacuum bag 120. The negative pressure forces vacuum bag 120 against part 140 to conform part 140 to tool 110. The negative pressure also causes vacuum bag 120 to tightly conform to the edge breathers (130, 132, 134, 136). This provides a benefit by holding part 140 tightly against the contours of tool 110 as part 140 consolidates, and also provides a benefit in that it may draw out volatile gases and air bubbles that may be present during processing of part 140. The processing of part 140 may therefore include curing, consolidating and/or drawing out volatiles, and may further involve the application of substantial amounts of pressure and/or heat.

Edge breathers (130, 132, 134, 136) of system 100 have been enhanced to exhibit a geometry that resists collapse under the pressure applied by vacuum bag 120. That is, edge breathers 130, 132, 134, and 136 are rigid with respect to crushing forces applied to their cross-sections, and are capable of resisting (or entirely preventing) deformation when vacuum bag 120 applies crushing pressure to their cross sections. In some embodiments, these edge breathers (130, 132, 134, 136) are also flexible along their length, ensuring that they may conform to the varying and even curving contours of different manufactured parts. As used herein, an edge breather is flexible "along its length" when it is capable of being dynamically adjusted and/or reshaped to conform to the edges of a complex part. For example, an edge breather that is reshaped from a straight line into a curved shape (e.g., without the application of more than ten foot-pounds of torque applied by a user), and retains the curved shape without returning to its original shape, may be considered an edge breather that is flexible along its length. Thus, the edge breathers described herein (130, 132, 134, 136) are rigid with respect to compression of their cross-sectional area, yet also flexible enough along their length to conform around different kinds of part geometry. Further details of the edge breathers (130, 132, 134, 136) will be described with regard to FIGS. 6-13 below.

Figure 2:
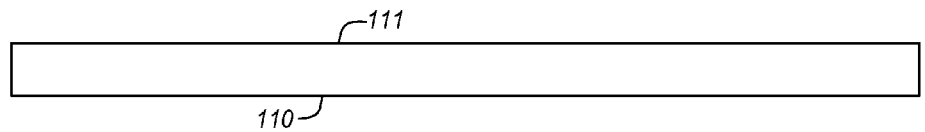
FIGS. 2-5 are section cut views illustrating preparation of a vacuum bag manufacturing system in an exemplary embodiment.

FIGS. 2-5 are section cut views of system 100 as system 100 is assembled in an exemplary embodiment. This view is represented by element 2 of FIG. 1. Further description of system 100 will therefore be provided with respect to FIGS. 2-5, which discuss how individual components may be assembled in order to facilitate vacuum bag manufacturing. FIG. 2 illustrates tool 110 (a mold) in a resting state. The top surface 111 of tool 110 may be coated with a release agent in order to ensure that parts placed atop tool 110 do not bind to tool 110 during and/or after the curing process.

Figure 3:
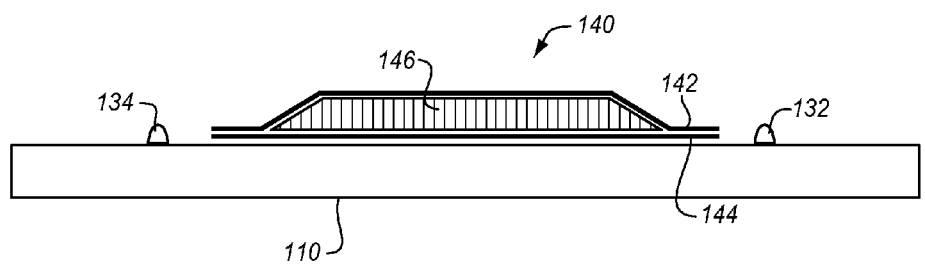

In FIG. 3, edge breathers (e.g., 132 and 134 as shown) are placed onto tool 110 in a first step for assembling system 100 atop tool 110 shown in FIG. 2. Part 140 is also placed on tool 110. In this embodiment, part 140 consists of layers/plies 142 and 144, as well as core 146. However, in further embodiments a solid laminate composite charge may take the place of core 146. In fact, any suitable composite structure may be utilized for part 140. Edge breathers 132 and 134 are placed within several inches (e.g., 2 to 12 inches) of part 140, and act as lanes for air proximate to part 140 to be sucked away from part 140. This ensures that air bubbles (not shown) will not interfere with the curing of part 140.

Figure 4:
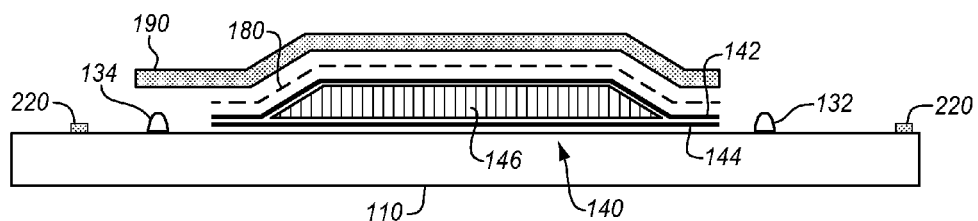

FIG. 4 illustrates a next step for assembling a system 100, in which further components are added to those shown in FIG. 3. Specifically, FIG. 4 illustrates that an edge sealant 220 (e.g., a double sided tape) has been applied onto tool 110 at the periphery of the breathers 132 and 134. FIG. 4 further illustrates the application of parting film 180 to part 140, as well as the application of a surface breather 190 atop parting film 180 and edge breathers 132 and 134. Parting film 180 may comprise a permeable Teflon layer that prevents part 140 from sticking to other components. The edge breathers (130, 132, 134, 136), in combination with surface breather 190, form passageways for air and volatile gases (e.g., volatile organic compounds) to exit part 140 before and/or during curing.

Figure 5:
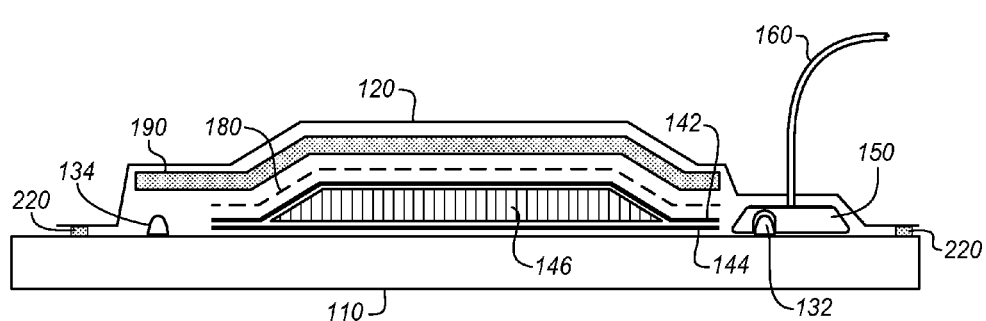

FIG. 5 illustrates a further step for assembling a system 100, in which still more components are added to those shown in FIG. 5. According to FIG. 5, part 140 is covered by parting film 180. Surface breather 190 and the components beneath it are sealed onto tool 110 by vacuum bag 120, which is attached via edge sealant 220 to tool 110. In this arrangement, surface breather 190 provides a porous lane through which air may travel into the edge breathers (130, 132, 134, 136), and then from the edge breathers (130, 132, 134, 136) to port 150. Vacuum port 150 covers an edge breather 132, and provides a route for air and/or volatiles to travel from an edge breather (e.g., 130, 132, 134, 136) out through vacuum hose 160. Vacuum pump 170 may therefore draw out air from vacuum bag 120 via the edge breathers (e.g., 132, 134) and out of vacuum port 150, pressing part 140 onto tool 110.

The process of adding and curing a layer ("lay up") onto to part 140 as shown in FIGS. 2-5 may continue as an iterative process to add and cure multiple layers, wherein new "green" layers are added to part 140 and cured, and then further new "green layers" are added again. Utilizing this technique a manufacturer may add, for example, several thousandths of an inch of thickness to part 140 at a time, until part 140 is completed.

Figure 6:
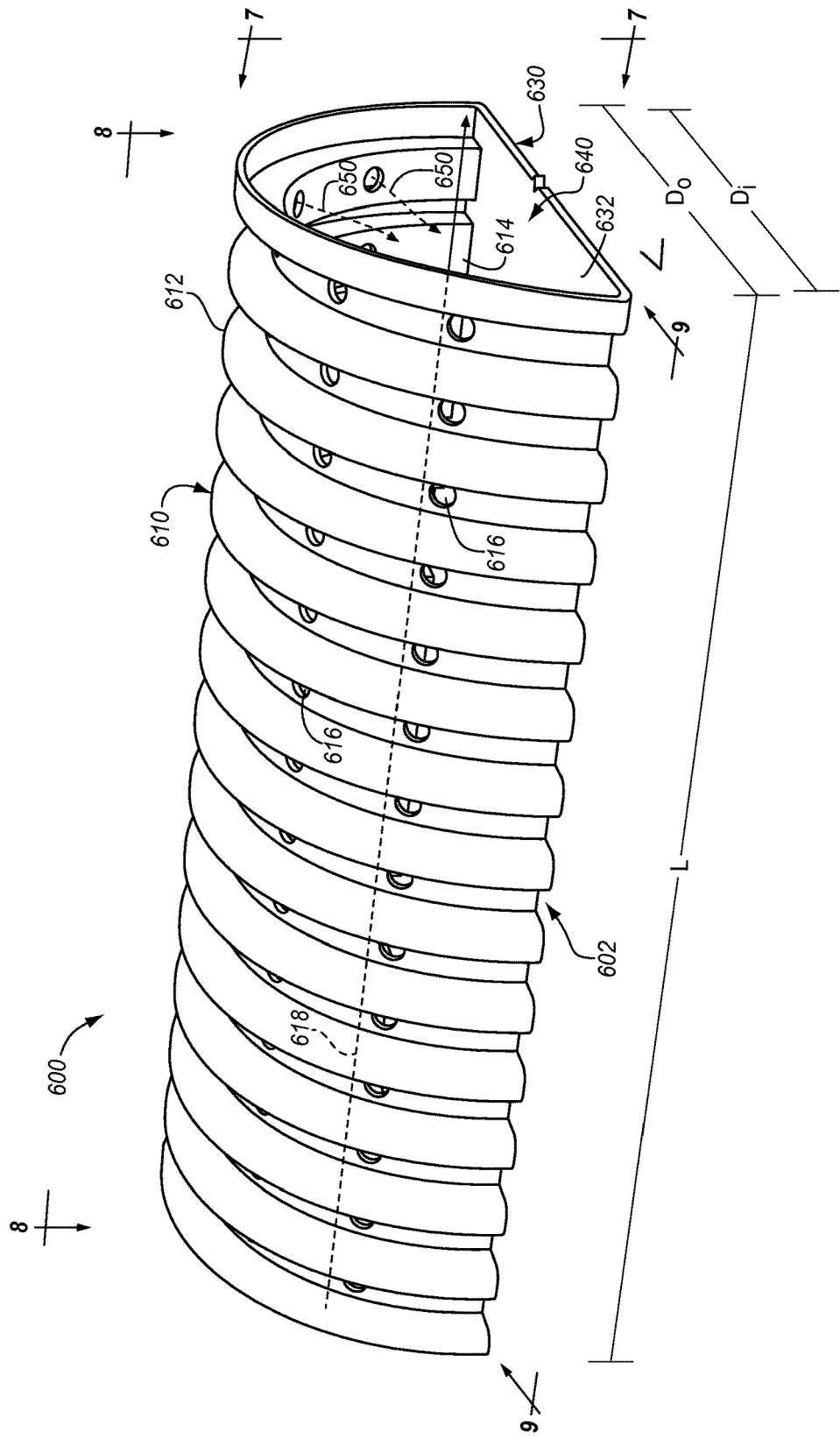
Figure 7:
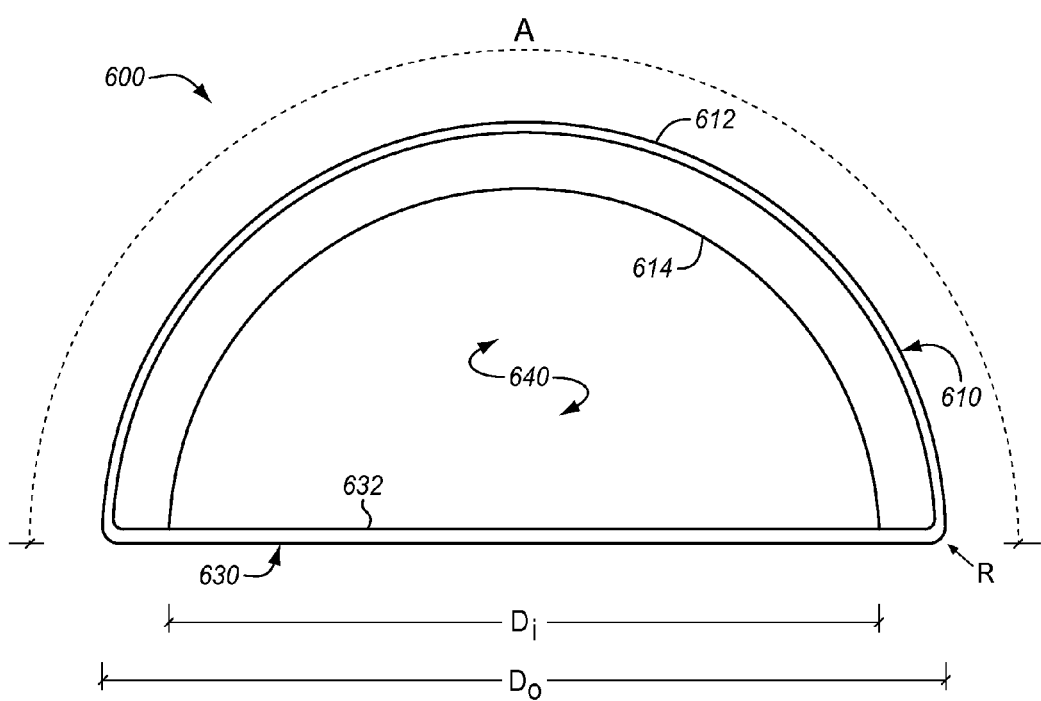

Illustrative details of the edge breathers described above will be discussed with regard the following FIGS. FIGS. 6-11 illustrate a first style of edge breather 600 in an exemplary embodiment that is capable of withstanding the heat and pressure of an autoclave curing process. FIG. 6 illustrates a perspective view of edge breather 600, FIG. 7 illustrates a front view of edge breather 600 shown by view arrows 7, FIG. 8 illustrates a top view of edge breather 600 shown by view arrows 8, and FIG. 9 illustrates a side view of edge breather 600 shown by view arrows 9.

In this embodiment, edge breather 600 has a body 602 in the form of an elongated tube with a D-shaped cross sectional shape/circumference. Upper surface 610 and lower surface 630 are outer surfaces of edge breather 600, which define the circumference of edge breather 600. In combination, these outer surfaces (610 and 630) define the boundaries of hollow interior 640. Furthermore, lower surface 630 of edge breather 600 defines a base 632. Base 632 is coupled with ridges 612 and furrows 614. While lower surface 630 is illustrated as being substantially flat, in further embodiments lower surface 630 may be shaped during manufacturing to exhibit a geometry that conforms to surface 111 of tool 110.

Ridges 612 and furrows 614 are integral with upper surface 610, which is corrugated. Ridges 612 also each define an arc (A), which is perpendicular to the lengthwise axis 618 of edge breather 600. These features enhance the cross-sectional strength of edge breather 600 against crushing forces, while the corrugation also ensures that edge breather 600 remains more flexible along its length than a corresponding edge breather lacking corrugation. In short, the arcs defined by the ridges and furrows resist compressive loads applied to edge breather 600 and prevent hollow interior 640 from collapsing under pressure applied to edge breather 600 by a vacuum bag during manufacturing of a composite part.

Ridges 612 exhibit a diameter $D_o$, while furrows 614 exhibit a diameter $D_i$ which is less than $D_o$. $D_o$ may also be considered the width (W) of edge breather 600. With respect to ridges 612 and furrows 614, the ratio of $D_i$ to $D_o$ may vary as desired. In one embodiment, $D_o$ is no more than twice as large as $D_i$. Varying $D_i$ and $D_o$ (and varying the linear distance between neighboring ridges 612) also alters the flexibility of edge breather 600 along its length. A combination of dimensions may therefore be chosen, for example, to ensure that edge breather 600 is capable of conforming to small radii of curvature (e.g., three inches) without returning to its original shape.

Upper surface 610 also includes one or more openings/holes 616, which penetrate from upper surface 610 to hollow interior 640. The holes 616 may be located on top of ridges 612, within ridges 612, or at furrows 614. The holes 616 may be inserted as many times as desired throughout edge breather 600, so long as they do not compromise the structural integrity of edge breather 600. While in operation, edge breather 600 functions as a corrugated tube through which air flow 650 may evacuate from part 140 and enter holes 616. This air flow 650 travels into and along the length (L) of edge breather 600.

In further embodiments, edge breather 600 may exhibit an elliptical or circular cross-section, or may even exhibit trapezoidal shapes with rounded corners (in which case rounded corners at the sides of the trapezoidal shape may function as arcs for bearing/distributing load), rounded rectangle, or other cross-sectional shapes. Furthermore, holes 616 of edge breather need not be collinear with each other, but rather may be spaced in any suitable pattern about edge breather 600, or may even be substantially randomly placed. While holes 616 are shown as being circular shaped in this embodiment, any suitable shape may be chosen. Similarly, the diameter of each hole 616 may vary or remain constant across edge breather 600. In one embodiment, edge breather 600 is less than one inch wide (e.g., three eighths of an inch), and holes 616 are less than one tenth of an inch in diameter (e.g., fifty thousandths of an inch). As shown in these FIGS., the "D" shaped cross-section of edge breather 600 includes rounded corners (R) which each exhibit corner radii that are selected to prevent rupturing or snagging a vacuum bag when curing a composite part.

Figure 10:
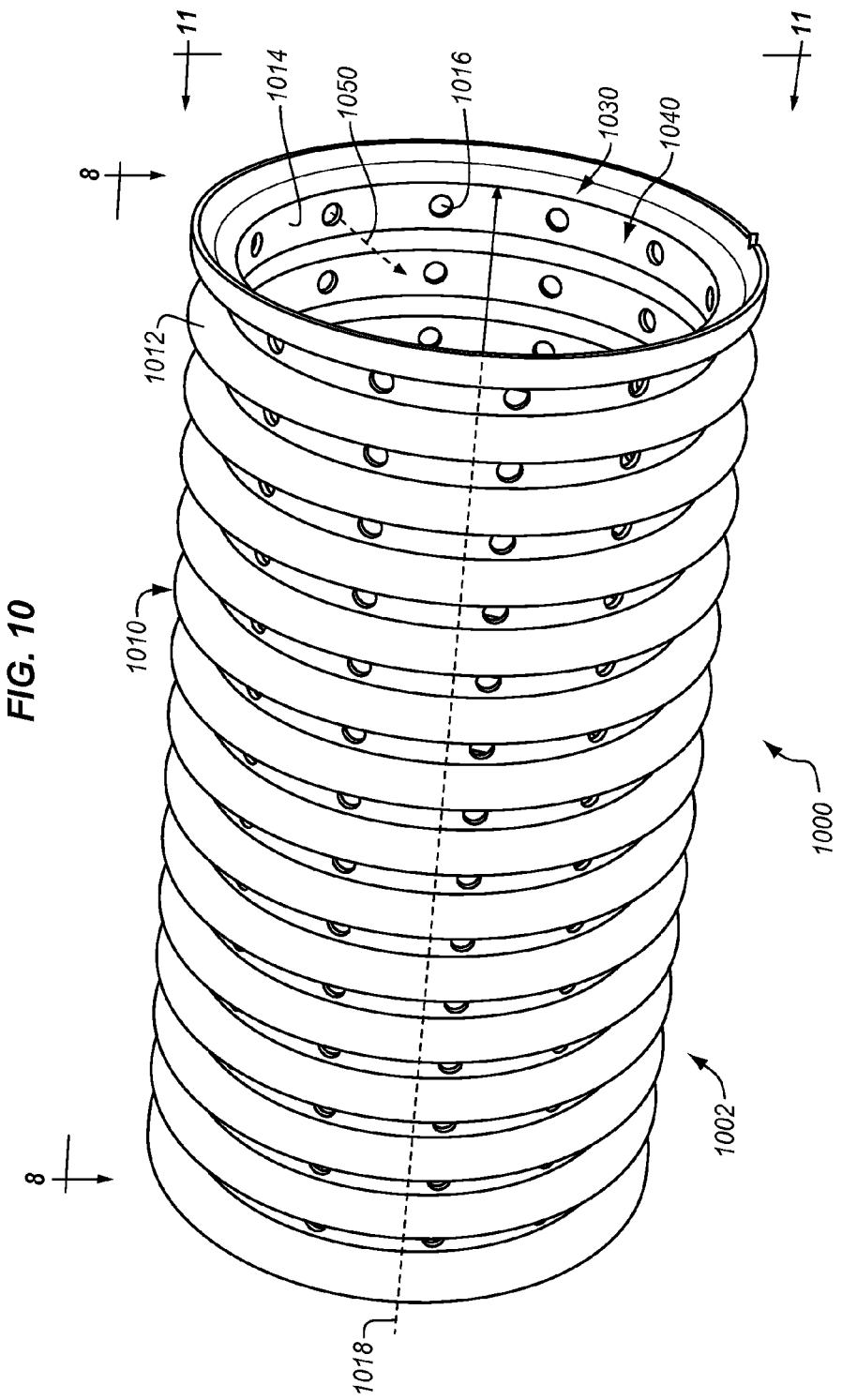
FIGS. 10-11 illustrate a variation of the first style of edge breather in an exemplary embodiment.
Figure 11:
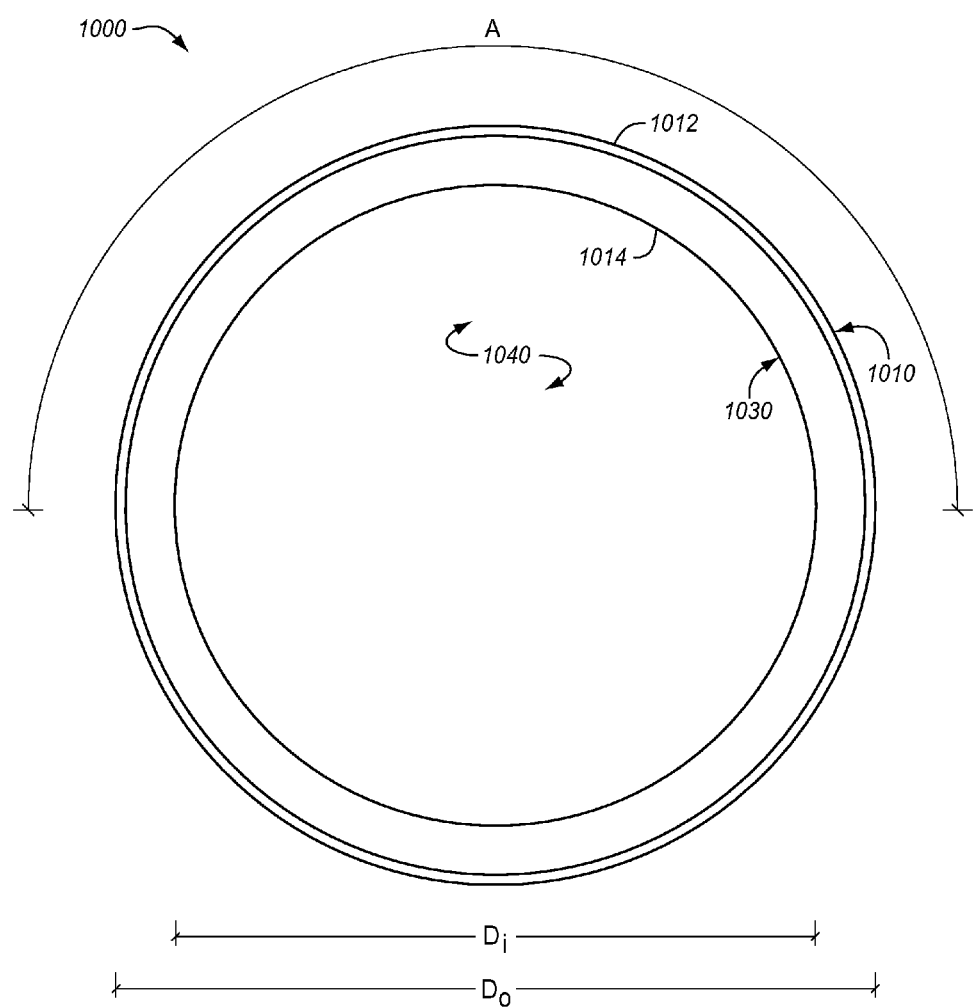

FIGS. 10-11 illustrate a variation of the first style of edge breather. In this embodiment, an edge breather 1000 includes a circular/elliptical cross-section. FIG. 10 illustrates a perspective view of edge breather 1000, and FIG. 11 illustrates a side view of edge breather 1000 indicated by view arrows 11. Edge breather 1000 includes a body 1002 with ridges 1012 (each defining an arc (A)), furrows 1014, and holes 1016. Air flow 1050 flows from holes 1016 to hollow interior 1040. Edge breather 1000 further includes a lengthwise axis 1018, an inner surface 1030, and an outer surface 1010. While edge breather 1000 is shown as a circular ellipse in FIGS. 10-11, eccentric ellipses (e.g., ellipses that are wider than they are tall) may also be utilized as desired to facilitate the curing process for a part 140.

FIGS. 12-15 illustrate a second style of edge breather 1200 formed from a helical coil spring that is capable of withstanding the heat and pressure of an autoclave curing process in an exemplary embodiment. FIG. 12 illustrates a perspective view of edge breather 1200, FIG. 13 illustrates a front view of a winding 1220 of edge breather 1200 shown by view arrows 13, FIG. 14 illustrates a top view of edge breather 1200 shown by view arrows 14, and FIG. 15 illustrates a side view of edge breather 1200 shown by view arrows 15.

Edge breather 1200 comprises multiple windings 1220 of a strand of wire 1210. Each winding 1220 has a cross-section with a hollow interior 1240, as shown in FIGS. 12-13. As used herein, a winding 1220 is one complete circumferential wrapping of wire 1210 about hollow interior 1240. Each winding 1220 forms a ridge 1222 that includes an arc (A), which is substantially perpendicular to a lengthwise axis 1218 of edge breather 1200. Each arc (A) resists crushing forces applied to edge breather 1200 by vacuum bag 120 during manufacturing of a composite part (e.g., part 140). Openings/gaps 1224 between windings 1220 enable air to freely enter and leave edge breather 1200. In this embodiment, each winding 1220 is in the shape of a "D" with rounded corners, although other geometries (e.g., circular, elliptical, etc.) are suitable for windings and/or cross sections of edge breather 1400. Each winding of edge breather 1200 includes rounded corners (R) which each exhibit corner radii that are selected to prevent rupturing or snagging a vacuum bag when curing a composite part.

Since edge breather 1200 is a coil spring, edge breather 1200 remains substantially flexible along its length and is capable of laying/conforming against curving and complex edge geometries. In further embodiments, the cross section defined by winding 1220 may vary in shape as desired. For example, windings 1220 may be elliptical or circular if desired.

Each winding 1220 of coil spring 1200 may touch adjacent windings 1220 of coil spring 1200. Since the windings 1220 are touching via contact force and are not sealed (or in some embodiments are not even touching), small gaps 1224 between the windings enable air to flow into and out of coil spring 1200 during the curing of part 140. In short, air and volatile gases may travel freely into edge breather 1200 through the spaces between windings 1220.

Wire 1210 includes a Wire Diameter (WD). Each winding 1220 of wire 1210 includes an Outer Diameter (OD). WD may be selected as a substantially small value with respect to OD in order to ensure that coil spring 1200 remains flexible along its length. For example, WD and OD may be selected so that OD is at least twice as large as WD.

Larger wire diameters are more rigid than smaller wire diameters, and hence may become inflexible when edge breather 1200 is conformed to a tight curve radius (e.g., a curve radius of three inches). Hence, choosing a smaller wire diameter such as fifty thousandths of an inch ensures that edge breather 1200 remains flexible along its length. In one embodiment, it may be beneficial to choose a wire diameter that is one hundred times smaller than the length of edge breather 1200. For example, in an embodiment relating to composite parts that are tens of feet in length (e.g., a wing of an aircraft), dimension OD may comprise three eighths of an inch, and dimension WD may comprise fifty thousandths of an inch. This size ensures that air flow 1250 through edge breather 1200 is not restricted, while also ensuring that a vacuum bag covering edge breather 1200 will not tear or rip.

The edge breathers described herein may be manufactured from any suitable materials, such as metal, three dimensional (3D) printing materials, plastics, etc. However, in some embodiments materials are chosen for their capability to resist a loss of strength when exposed to the high temperatures and pressures involved in autoclave curing for composite parts (e.g., hundreds of degrees, at one or more atmospheres of pressure).

Figure 16:
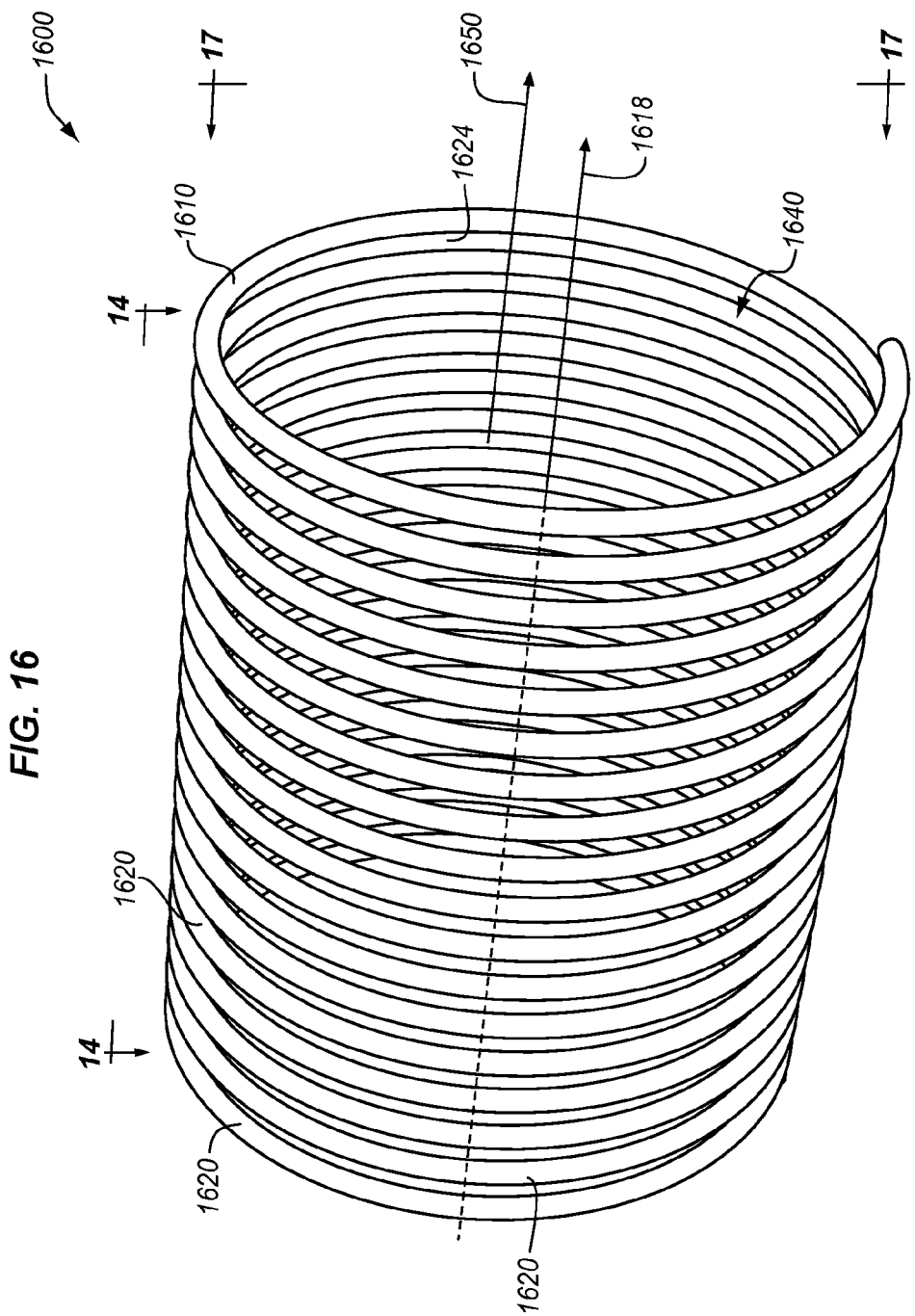
FIGS. 16-17 illustrate a variation of the second style of edge breather in an exemplary embodiment.
Figure 17:
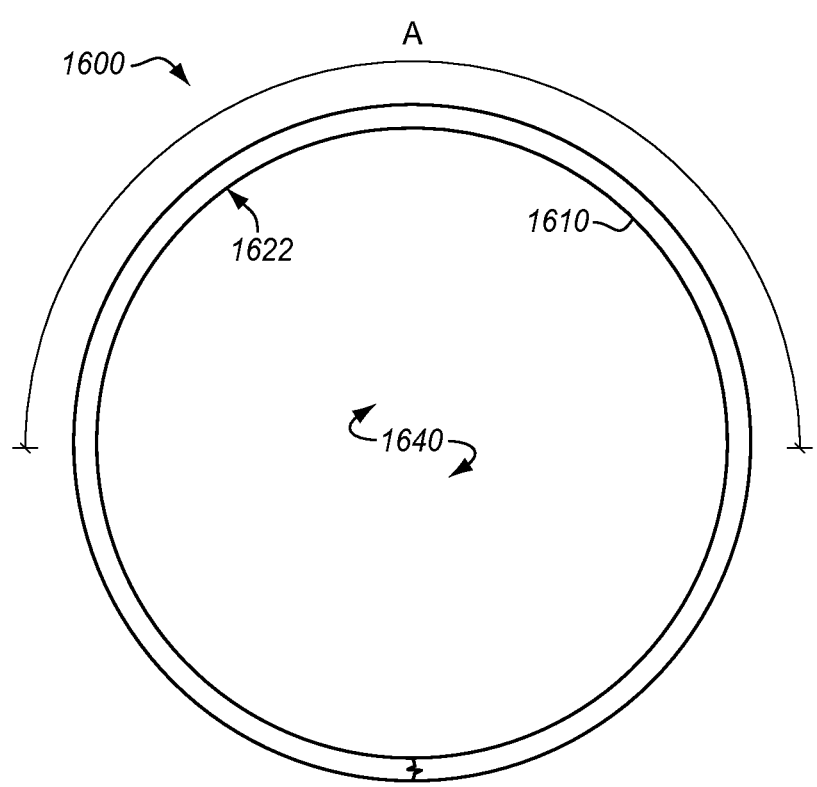

FIGS. 16-17 illustrate a variation of the second style of edge breather. In this embodiment, an edge breather 1600 includes a circular/elliptical cross-section. FIG. 16 illustrates a perspective view of edge breather 1600, and FIG. 17 illustrates a front view of edge breather 1600 indicated by view arrows 17. Edge breather 1600 includes wire 1610 formed into windings 1620 that each include a ridge 1622 defining an arc (A). Air flow 1650 flows from gaps 1624 through windings 1620 into hollow interior 1640. Edge breather 1600 further includes a lengthwise axis 1618.

Figure 18:
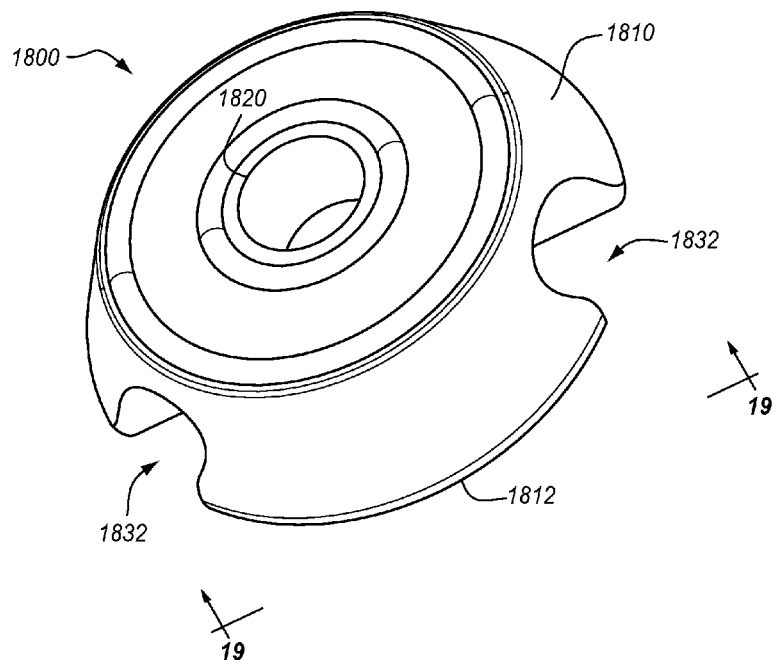
FIGS. 18-21 illustrate a vacuum port for drawing air out of an edge breather in an exemplary embodiment.
Figure 19:
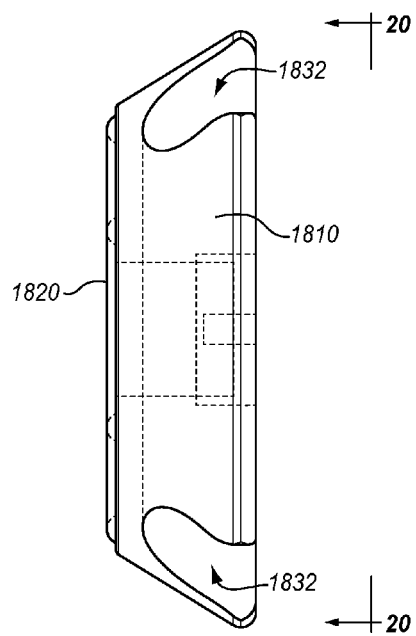
Figure 20:
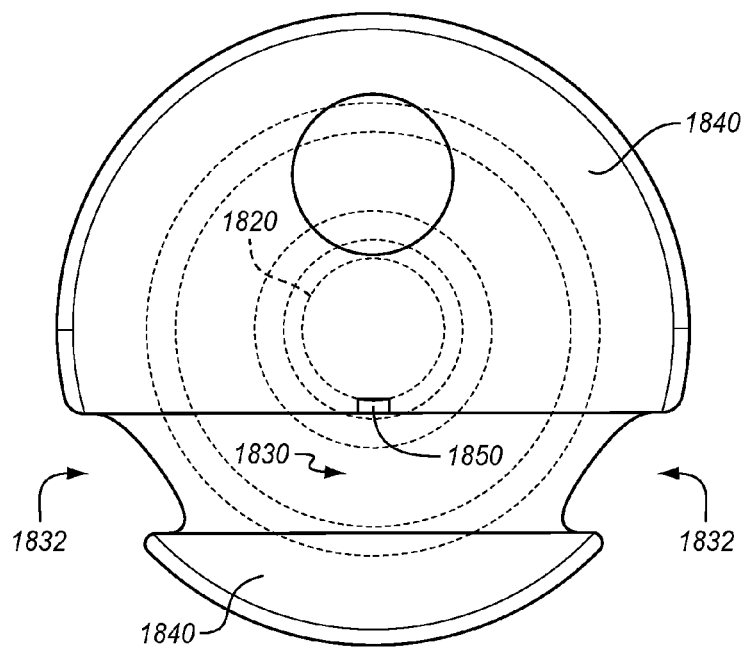
Figure 21:
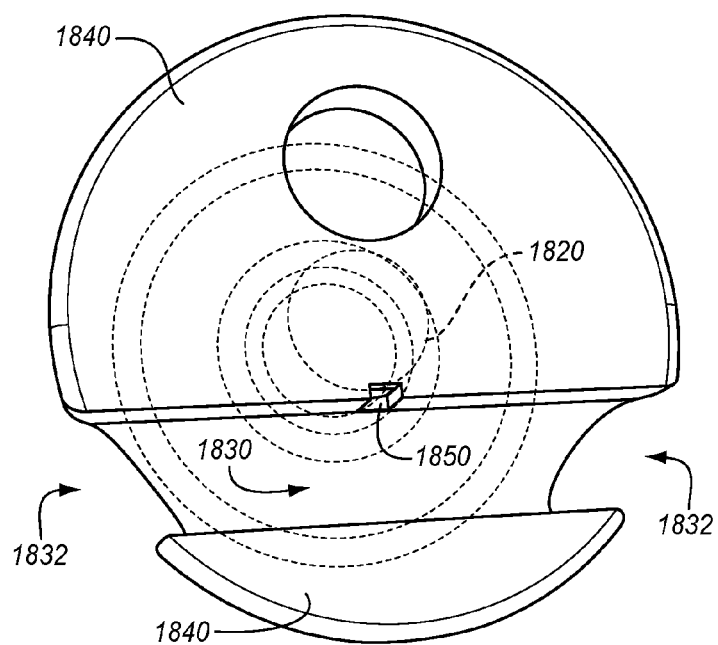

FIGS. 18-21 illustrate a vacuum port 1800 for drawing air out of an edge breather (e.g., any of the edge breathers discussed above) in an exemplary embodiment. FIG. 18 is a perspective view, FIG. 19 is a side view indicated by view arrows 19, FIG. 20 is a bottom view indicated by view arrows 20, and FIG. 21 is an additional perspective view. Port 1800 is designed to lay atop one of the edge breathers described above, without pinching or crushing such an edge breather. In this embodiment, port 1800 includes port body 1810, which is substantially rounded to ensure that a vacuum bag 120 placed over port 1800 will not tear or rip during the curing process. Port body 1810 includes vacuum fitting 1820 for attachment to vacuum line 160. Port body 1810 also includes one or more openings 1832 along a sidewall edge 1812. Openings 1832 serve as endpoints of passageway 1830.

Passageway 1830 is dimensioned to cover one of the edge breathers described above without compressing the edge breather, and passageway 1830 cuts through bottom portion 1840 of vacuum port 1800. Hence, an edge breather may be inserted into port 1800 via passageway 1830, or port 1800 may be placed atop the edge breather (e.g., without compressing the edge breather or otherwise blocking air flow). Passageway 1830 is illustrated as being linear, but in further embodiments may be curved about fitting 1820 as desired. In further embodiments, passageway 1830 includes only one opening 1832, and port 1800 operates as a terminus for the edge breather.

Bottom portions 1840 couple port 1800 to tool 110. For example, bottom portions 1840 may be magnetic and designed to physically attach port 1800 to tool 110, may comprise weighted components to ensure that port 1800 does not drift/slide during the curing process, etc. Port 1800 also defines channel 1850, through which air may travel freely from the edge breather out through vacuum line 160 (as shown in FIG. 1).

Figure 22:
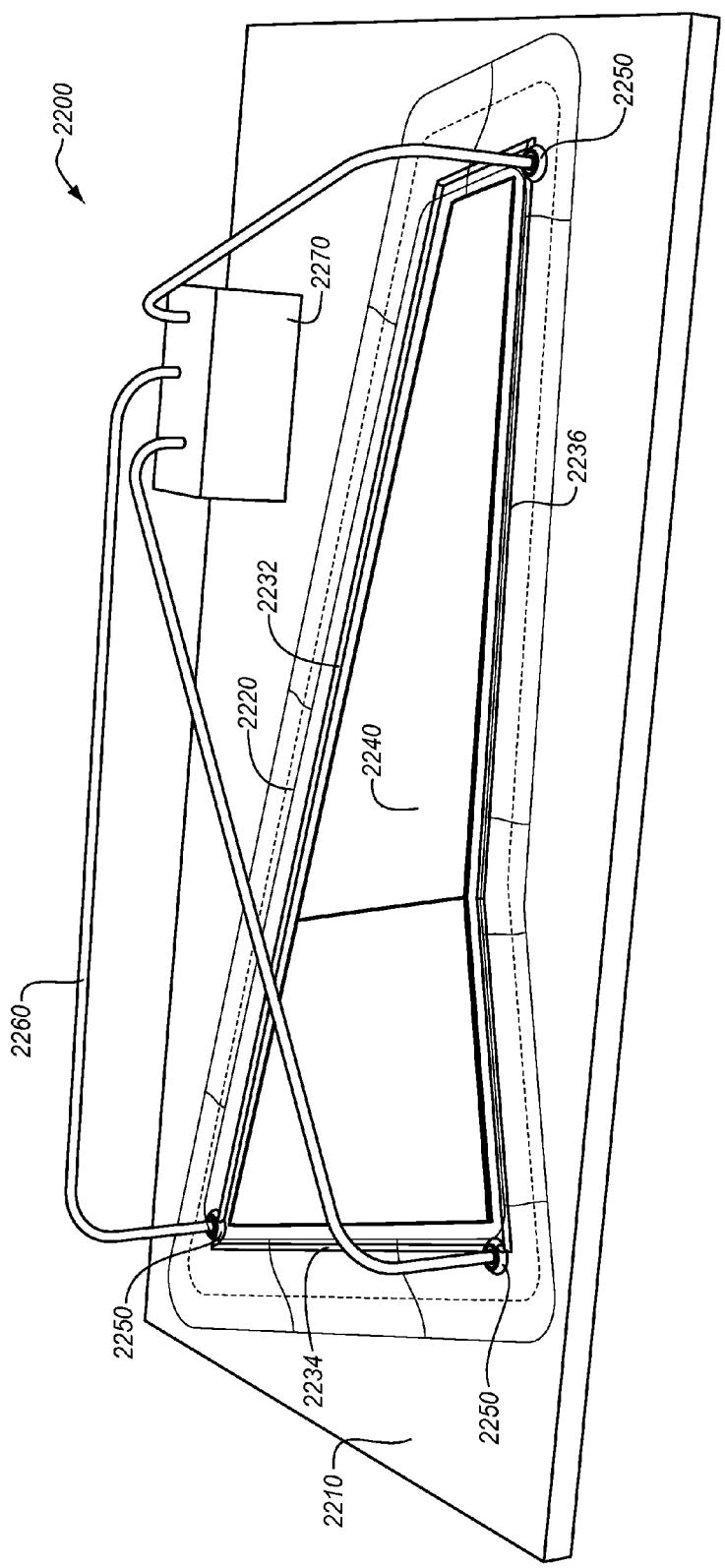
FIG. 22 is a diagram of a complete vacuum bag manufacturing system in an exemplary embodiment.

FIG. 22 is a diagram of a complete vacuum bag manufacturing system 2200 in an exemplary embodiment. System 2200 includes the enhanced edge breathers and vacuum ports discussed above. In this embodiment, part 2240 is laid-out on a tool 2210 for curing. Edge breathers 2232, 2234, and 2236 are placed along the edge of part 2240, and are connected to vacuum ports 2250, which penetrate vacuum bag 2220. Compressor 2270 draws air out via vacuum lines 2260, which results in air traveling via the edges of part 2240 to the edge breathers (2232, 2234, 2236) and out through ports 2250.

Figure 23:
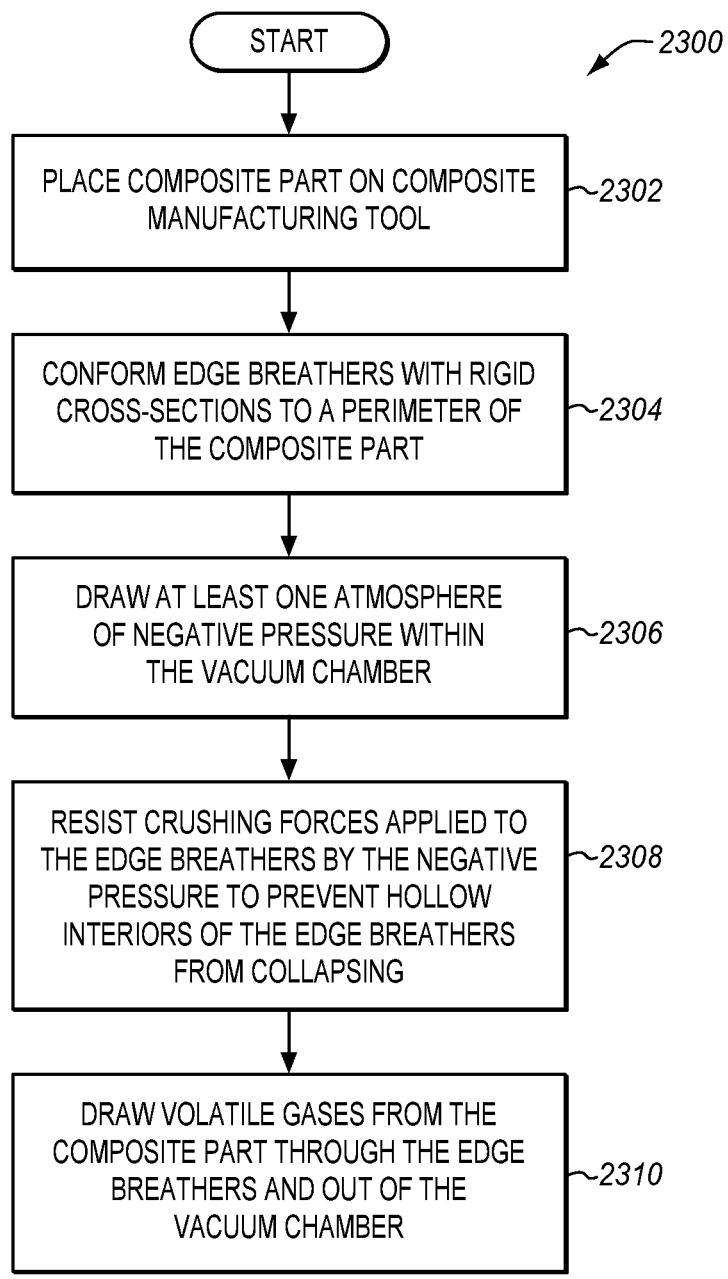
FIG. 23 is flowchart illustrating a method for utilizing a vacuum bag manufacturing system in an exemplary embodiment.

The operation of system 100 will be discussed with regard to FIG. 23. Assume, for this embodiment, that part 140 is ready to be cured but has not yet been placed onto tool 110. FIG. 23 is a flowchart illustrating a method 2300 for utilizing a vacuum bag manufacturing system 100 in an exemplary embodiment. The steps of method 2300 are described with reference to system 100 of FIG. 1, but those skilled in the art will appreciate that method 2300 may be performed in other vacuum bag manufacturing systems. The steps of the flowcharts described herein are not all inclusive and may include other steps not shown. The steps described herein may also be performed in an alternative order.

According to FIG. 23, composite part 140 is placed/laid on top of tool 110 (step 2302). Edge breathers (130, 132, 134, 136) conforming with one or more of the enhanced geometries described above are then selected for use with part 140, and may be flexibly conformed/reshaped/adjusted/contoured to a perimeter of part 140 (step 2304). A vacuum chamber comprising vacuum bag 120 may then be created around composite part 140 and the edge breathers (130, 132, 134, 136), as described above with respect to FIGS. 2-5. A negative pressure of at least one atmosphere is drawn in the vacuum chamber via vacuum hose 160 (step 2306), and gases are drawn from part 140 through edge breather 132. During this process, the edge breathers (130, 132, 134, 136), which are rigid with respect to their cross-sections, resist crushing forces that are applied while the vacuum is drawn (step 2308). This prevents the interiors of the edge breathers (130, 132, 134, 136) from getting pinched or crushed, or otherwise collapsing. Furthermore, since the edge breathers (130, 132, 134, 136) resist crushing forces, air is drawn from part 140 through the edge breathers (130, 132, 134, 136) and out of the vacuum chamber (step 2310). Since the interiors of the edge breathers (130, 132, 134, 136) do not collapse, volatile gases are drawn from part 140 through the edge breathers (130, 132, 134, 136) and out of the vacuum chamber.

Figure 24:
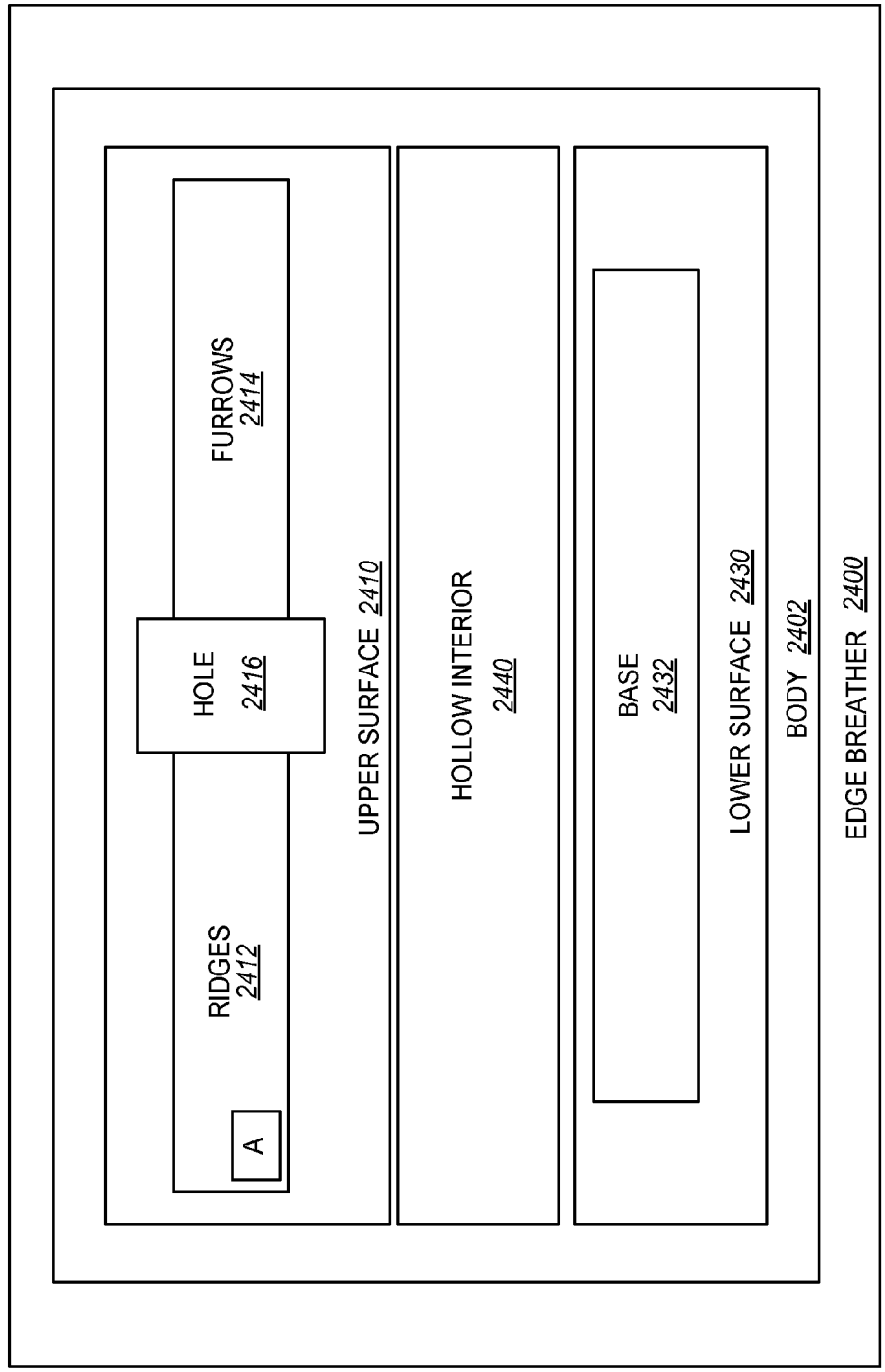
FIG. 24 is a block diagram of an edge breather in an exemplary embodiment.

FIG. 24 is a block diagram of an edge breather 2400 in an exemplary embodiment. FIG. 24 illustrates that edge breather 2400 includes body 2402. Body 2402 comprises lower surface 2430, which includes base 2432. Edge breather 2400 also includes upper surface 2410, which includes ridges 2412, furrows 2414, and hole 2416. Hole 2416 penetrates into interior 2440. Interior 2440 is bounded by ridges 2412, furrows 2414, and base 2432. In this embodiment, each ridge 2412 defines an arc (A).

Figure 25:
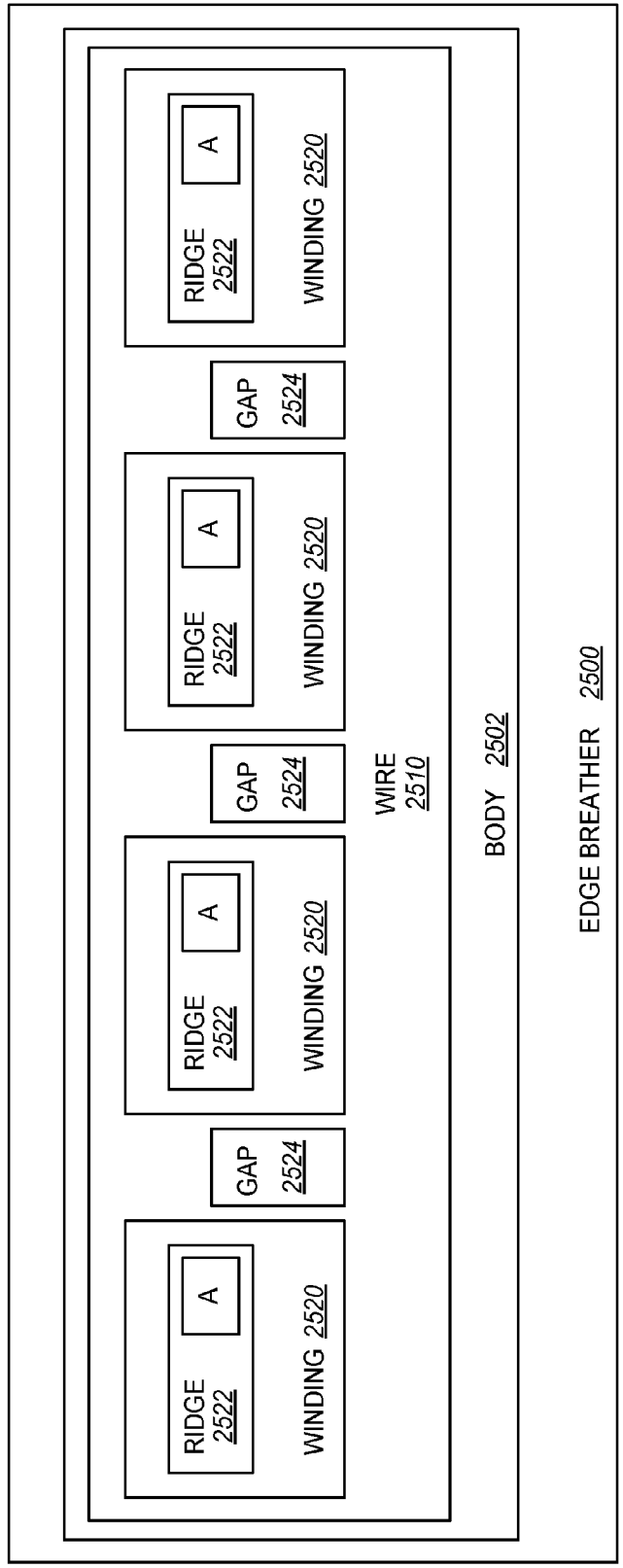
FIG. 25 is a block diagram of a further edge breather in an exemplary embodiment.

FIG. 25 is a block diagram of a further edge breather 2500 in an exemplary embodiment. In this embodiment, edge breather 2500 includes body 2502. Body 2502 includes wire 2510, which is wound into multiple windings 2520. Each winding 2520 includes a ridge 2522, which defines an arc (A). Arcs (A) are dimensioned to resist crushing pressure applied by a vacuum bag to edge breather 2500 during composite manufacturing processes. Gaps 2524 are disposed between each winding, enabling air to enter body 2502.

Figure 26:
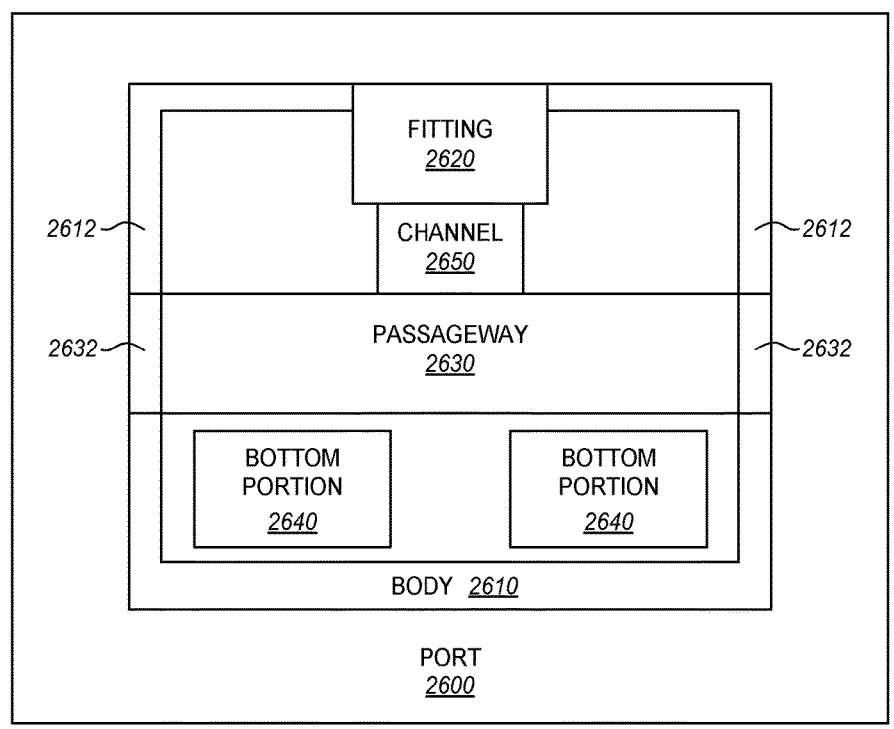
FIG. 26 is a block diagram of a vacuum port in an exemplary embodiment.

FIG. 26 is a block diagram of a vacuum port 2600 in an exemplary embodiment. In this embodiment, port 2600 includes a body 2610. Body 2610 includes an edge 2612, through which openings 2632 penetrate. Passageway 2630 is bounded on either side by openings 2632, and is dimensioned to receive a rigid edge breather without crushing the rigid edge breather. Passageway 2630 is coupled with fitting 2620 via channel 2650. Channel 2650 is hollow. Hence, channel 2650 enables air to flow between an edge breather in passageway 2630 and fitting 2620. Port 2600 also comprises bottom portions 2640, which may be used to magnetically couple vacuum port 2600 with a composite manufacturing tool.

Figure 27:
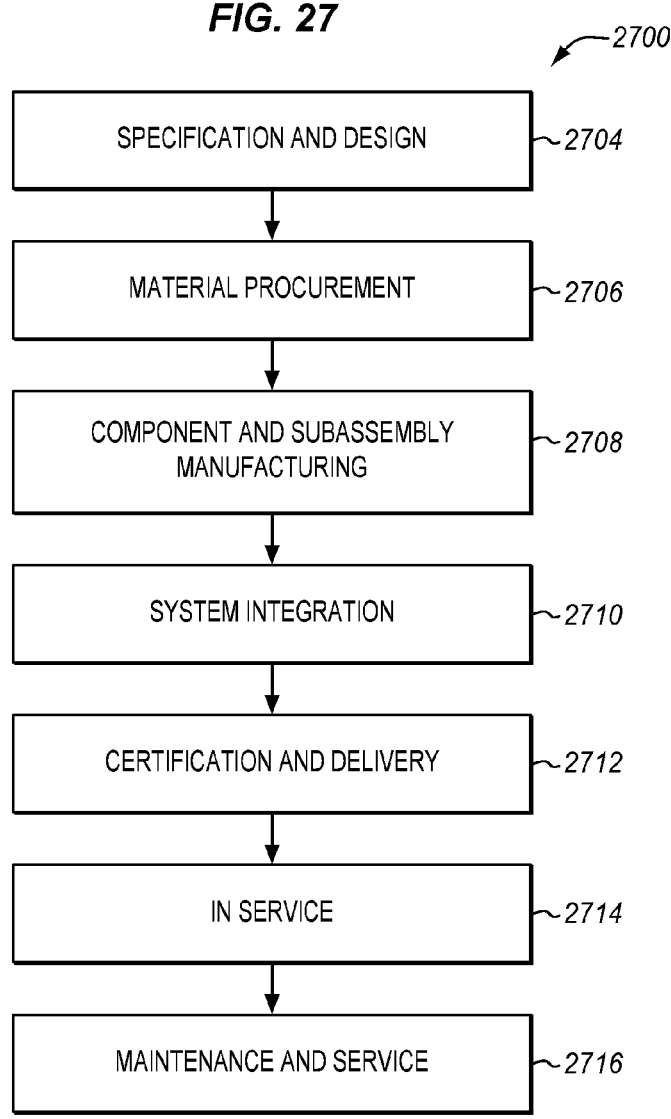
FIG. 27 is a flow diagram of aircraft production and service methodology in an exemplary embodiment.
Figure 28:
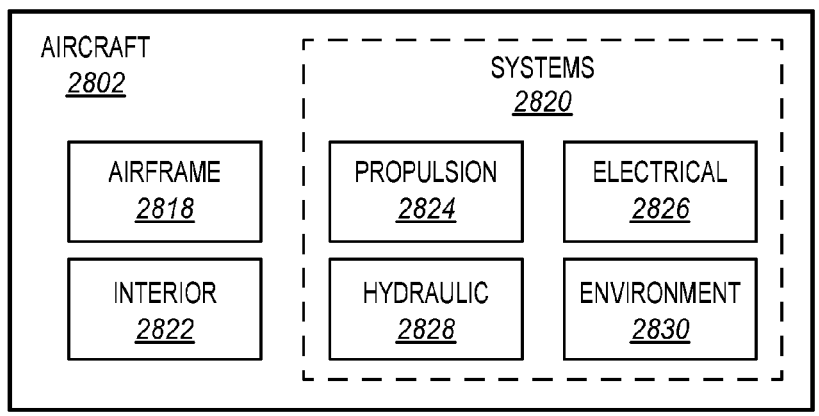
FIG. 28 is a block diagram of an aircraft in an exemplary embodiment.

Referring more particularly to the drawings, embodiments of the disclosure may be described in the context of an aircraft manufacturing and service method 2300 as shown in FIG. 27 and an aircraft 2802 as shown in FIG. 28. During pre-production, exemplary method 2700 may include specification and design 2704 of the aircraft 2802 and material procurement 2706. During production, component and subassembly manufacturing 2708 and system integration 2710 of the aircraft 2802 takes place. Thereafter, the aircraft 2802 may go through certification and delivery 2712 in order to be placed in service 2714. While in service by a customer, the aircraft 2802 is scheduled for routine maintenance and service 2716 (which may also include modification, reconfiguration, refurbishment, and so on).

In one embodiment, part 140 comprises a portion of airframe 2818, and is manufactured during component and subassembly manufacturing 2708 via the use of edge breathers 130, 132, 134, and 136. Part 140 may then be assembled into an aircraft in system integration 2710, and then be utilized in service 2714 until wear renders part 140 unusable. Then, in maintenance and service 2716, part 140 may be discarded and replaced with a newly manufactured part 140. Edge breathers (130, 132, 134, 136) may be utilized throughout component and subassembly manufacturing 2708 in order to manufacture part 140. Edge breathers (130, 132, 134, 136) may even potentially be utilized for maintenance and service 2716 in order to repair or refurbish worn or damaged parts 140.

Each of the processes of method 2700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 28, the aircraft 2802 produced by exemplary method 2700 may include an airframe 2818 with a plurality of systems 2820 and an interior 2822. Examples of high-level systems 2820 include one or more of a propulsion system 2824, an electrical system 2826, a hydraulic system 2828, and an environmental system 2830. Any number of other systems may be included. Although an aerospace example is shown, the principles of the invention may be applied to other industries, such as the automotive industry.

Apparatus and methods embodied herein may be employed during any one or more of the stages of the production and service method 2700. For example, components or subassemblies corresponding to production stage 2708 may be fabricated or manufactured in a manner similar to components or subassemblies produced while the aircraft 2802 is in service. Also, one or more apparatus embodiments, method embodiments, or a combination thereof may be utilized during the production stages 2708 and 2710, for example, by substantially expediting assembly of or reducing the cost of an aircraft 2702. Similarly, one or more of apparatus embodiments, method embodiments, or a combination thereof may be utilized while the aircraft 2802 is in service, for example and without limitation, to maintenance and service 2716, or at component and subassembly 2708, or at system integration 2710, or even at certification and delivery 2712 for use in relation to airframe 2818.

Any of the various operations described herein may be managed/controlled by computer-controllable elements implemented as hardware, software, firmware, or some combination of these. For example, the operations of vacuum pump 170 or a robot arm (not shown) may be controlled by dedicated internal hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
an edge breather configured to facilitate manufacturing of a composite part, the edge breather comprising:
a body;
ridges disposed along a length of the body that each define an arc which is perpendicular to a lengthwise axis of the body; and
openings disposed along the body that enable air to enter a hollow interior that runs along the length of the body,
wherein the arcs defined by the ridges resist compressive loads applied to the edge breather and prevent the hollow interior from collapsing under pressure applied to the edge breather by a vacuum bag during manufacturing of the composite part, wherein a linear distance between the ridges varies, resulting in altered flexibility of the edge breather along its length.

2. The apparatus of claim 1, wherein:
the body comprises a corrugated tube with a solid outer surface,
the ridges are integral with the outer surface,
the outer surface further comprises furrows disposed between the ridges, and
the openings comprise holes disposed along the length of the body that penetrate from the outer surface into the hollow interior.

3. The apparatus of claim 1 wherein:
a cross-sectional shape of the edge breather is "D" shaped, and corners of the cross-sectional shape are rounded to prevent rupture of a vacuum bag placed over the edge breather.

4. The apparatus of claim 2 wherein:
the openings are disposed within the furrows at the body.

5. The apparatus of claim 4 wherein:
the openings are randomly placed along the body.

6. The apparatus of claim 2 wherein:
the edge breather is configured to hold its shape when conforming to lengthwise bends having a radii of curvature of three inches or more.

7. The apparatus of claim 2 wherein:
the holes are collinear with each other, and are disposed within the furrows.

8. The apparatus of claim 1 wherein:
the ridges are separated by furrows, and
a ratio of ridge diameter to furrow diameter varies between ridges, resulting in altered flexibility of the edge breather along its length.

9. The apparatus of claim 2 wherein:
a base of the edge breather conforms to a surface of a composite manufacturing mold.

10. Fabricating a portion of an aircraft using the apparatus of claim 1, by providing a mold, placing a preform on the mold, placing the edge breather of claim 1 on the mold, placing the vacuum bag over the mold, applying a vacuum via the vacuum bag, curing resin within the preform, and removing volatile gases from the preform via the edge breather to fabricate a composite part, and integrating the composite part into the aircraft.

11. An apparatus comprising:
an edge breather configured to facilitate manufacturing of a composite part, the edge breather comprising:
a body comprising a strand of wire formed into multiple windings around a hollow interior;
ridges disposed along a length of the body that each are integral with one of the windings and each define an arc; and
openings disposed along the body that enable air to enter the hollow interior, wherein the openings are gaps between the windings of the wire along the length of the body,
wherein the arcs defined by the ridges resist compressive loads applied to the edge breather and prevent the hollow interior from collapsing under pressure applied to the edge breather by a vacuum bag during manufacturing of the composite part,
wherein a linear distance between the ridges varies, resulting in altered flexibility of the edge breather along its length.

12. The apparatus of claim 11 wherein:
the strand of wire comprises a helical coil spring.

13. The apparatus of claim 11 wherein:
each winding has a "D" shaped cross-section, and corners of the cross-sectional shape are rounded to prevent rupture of a vacuum bag placed over the edge breather.

14. The apparatus of claim 11 wherein:
a ratio of outer diameter of the wire to wire diameter is at least two.

15. The apparatus of claim 14 wherein:
a ratio of outer diameter of the wire to wire diameter is between two and seven point five.

16. The apparatus of claim 11 wherein:
a length of the edge breather is at least one hundred times larger than a diameter of the wire.

17. The apparatus of claim 11 wherein:
a lower portion of the edge breather conforms to a surface of a composite manufacturing mold.

18. The apparatus of claim 11 wherein:
the edge breather is configured to hold its shape when conforming to lengthwise bends having a radii of curvature of three inches or more.

19. Fabricating a portion of an aircraft using the apparatus of claim 11, by providing a mold, placing a preform on the mold, placing the edge breather of claim 10 on the mold, placing the vacuum bag over the mold, applying a vacuum via the vacuum bag, curing resin within the preform, and removing volatile gases from the preform via the edge breather to fabricate a composite part, and integrating the composite part into the aircraft.

* * * * *